3,020,321
Patented Feb. 6, 1962

3,020,321
PREPARATION OF FLUOROOLEFINS
Hugh Harper Gibbs, Wilmington, Del., assignor to E. I. du Pont de Nemours and Company, Wilmington, Del., a corporation of Delaware
No Drawing. Filed Dec. 4, 1958, Ser. No. 778,080
12 Claims. (Cl. 260—653.3)

The present invention relates to a process for the preparation of fluoroolefins, and, more particularly, to the preparation of fluoroolefins from fluorocarbon acid halides.

One of the processes developed heretofore for the preparation of fluoroolefins is the pyrolytic decarboxylation and defluorination of alkali metal salts of fluorocarbon acids. The starting material for this process is usually obtained by the fluorination of the corresponding hydrocarbon acid through electrolysis with hydrogen fluoride followed by the hydrolysis of the resulting fluorocarbon acid fluoride to the acid and the subsequent formation of the alkali metal salt from the acid. This method for the preparation of fluoroolefins therefore requires a three-step synthesis for the formation of the starting material. The present invention resulted from research carried out to discover simplified and more economical methods for the preparation of fluoroolefins.

It is one of the objects of the present invention to prepare fluoroolefins. It is another object of the present invention to prepare fluoroolefins from fluorocarbon acid halides. Yet another object of the present invention is to prepare fluoroolefins by a one-step reaction from the fluorocarbon acid halide. Other objectives will become apparent hereinafter.

In accordance with the present invention, fluoroolefins are prepared by a process which comprises contacting of fluorocarbon acid halide having the general formula $XC_nF_{2n}COY$ and $C_{n+2}F_{2(n+2)}(COY)_2$, wherein X is a member of the class consisting of hydrogen and fluorine, Y is a halogen, and $n$ is an integer of greater than 1, in vaporized form with a catalyst selected from the group consisting of stable oxides and oxygen containing salts of silicon and metals of groups I–A and II–A of the periodic table of elements, at a temperature of 200° to 500° C., and recovering a fluoroolefin having the general formula $XC_nF_{2n-1}$ and $C_{n+2}F_{2(n+2)-2}$, where X and $n$ are the same as above.

The process of the present invention is suitably carried out by passing the fluorocarbon acid halide in vaporized form and admixed with an inert gas carrier, such as nitrogen or helium, through a column or tower containing the catalyst in pelletized or otherwise finely divided, porous form; the tower or column being maintained at a temperature of 200° to 500° C. and preferably at a temperature of 300° to 400° C. Contact times are not critical and may vary widely; preferred contact times ranging from 30 sec. to 30 min. The product emerging from the tower is then passed through a number of cold traps which condense the product and separate the fluoroolefins from any by-products. The fluoroolefins formed are readily separated by these cold traps from the by-products because of the significant difference in the boiling points of the components of the product mixture. The fluoroolefin is generally obtained in high yields and high conversions and has the structure of a vinyl fluoroolefin or an internally unsaturated fluoroolefin. The formation of one or the other or both is dependent on the type of catalyst employed, the temperature, and the contact time. Terminally and internally unsaturated fluoroolefins are readily separated by distillation.

The catalysts which convert the fluorocarbon acid halide to the fluoroolefin are the oxides and oxygen containing salts of silicon and the metals of groups I–A and II–A of the periodic table, which are stable at the reaction temperature. A stable oxide or oxygen containing salt is defined for purposes of the present description as one which does not decompose when heated in an inert atmosphere to the reaction temperature contemplated in the present process. The periodic table herein referred to is the periodic table of elements such as shown in the "Handbook of Chemistry and Physics," Chemical Rubber Publishing Co., 37th ed., page 392, and includes in groups I–A and II–A the alkali metals lithium, sodium, potassium, rubidium and cesium, and the alkaline earth metals, strontium, calcium and barium, as well as beryllium and magnesium. Oxides which are suitable as catalysts in the present invention are such oxides as magnesium oxide, calcium oxide, strontium oxide, barium oxide and silica. Oxygen-containing salts of metals of groups I–A and II–A of the periodic table which show catalytic activity include in particular the sulfates, phosphates, sulfites, phosphites, nitrates and nitrites of the alkali and alkaline earth metals. Metal silicates, in general, are also capable of catalyzing the decarboxylation of the acid halides to the fluoroolefins. The quantity of catalyst employed is in accordance with known solid-gas phase reactions and should be sufficient to allow contact of all of the vaporized halide with the catalyst.

The fluorocarbon acid halides which are converted to the fluoroolefins include the fluorocarbon acid fluorides, chlorides, bromides and iodides. Of these, however, the fluorides are greatly preferred since the fluorides are directly obtained from the electrolysis of a hydrocarbon acid with hydrogen fluoride. As defined hereinabove, the fluorocarbon radical attached to the carbonyl group is either a perfluorocarbon radical or a substantially perfluorinated hydrocarbon radical having a hydrogen at the carbon atom in the omega-position. In the formation of the fluoroolefin from the fluorocarbon acid halides, the perfluorocarbon radical and the substantially perfluorinated hydrogen radical attached to the carbonyl group are equivalent and the presence of the hydrogen atom at the end of the chain does not influence or affect the conversion of the acid halide to the fluoroolefin. Similarly the size of the fluorocarbon radical attached to the carbonyl group does not affect the conversion of the acid halide to the olefin. However, fluorocarbon acid halides which have from 2 to 20 carbon atoms in the fluorocarbon radical are preferred because these acid halides are more readily vaporized and reacted with the solid catalyst of the present invention. Examples of acid halides which are suitably employed in the preparation of the fluoroolefins by the process of the present invention include such compounds as perfluorobutanoyl fluoride, perfluorobutanoyl chloride, perfluoropentanoyl bromide, perfluoroheptanonyl fluoride, perfluorooctanoyl fluoride, perfluorodecanoyl fluoride, perfluorooctanoyl chloride, omega-hydroperfluorooctanoyl fluoride, omega-hydroperfluorohexanoyl fluoride, omega-hydroperfluoropentanoyl fluoride and omega-hydroperfluorododecanoyl chloride. The process of the present invention may be utilized to prepare diolefins from fluorinated dicarboxylic acid halides having at least six carbon atoms.

The invention is further illustrated by the following examples:

*Examples I to XII*

A 12 in. long, 1 in. diameter nickel tube was placed vertically in a 12 in. split tube furnace. The nickel tube was filled to a depth of 11 in. with the catalyst indicated in the attached table in pelletized form, the pellets having a 3/16 in. diameter. A fraction cutter was attached to the top of the tube and a cold trap cooled by Dry Ice was attached at the bottom of the tube. The tube was heated to the temperature indicated in the table and nitrogen was passed through the tube at the rate of 10 ml. per min. This corresponded to an approximate contact time of 10 min. Into the nitrogen stream was dropped, over a period of 10 min., one ml. of the fluorocarbon acid halides listed in the table. After completion of the reaction, the nitrogen flow was continued for an additional 10 min. The resulting pyrolysate was condensed in the cold trap and comprises in each run from 0.7 to 0.9 ml. of the fluoroolefin. The product was then analyzed by infrared spectroscopy and gas chromatography as to its composition. The fluoroolefins obtained are listed in the table.

Examples XI and XII demonstrate that in the absence of a catalyst, or in presence of an inert solid, no conversion of the acid fluoride is obtained.

| Example No. | Fluorocarbon Acid Halide | Catalyst | Contact Time in min. | Reaction Temp. in °C. | Product |
|---|---|---|---|---|---|
| I | $C_7F_{15}COF$ | $Na_2SO_4$ | 10 | 380 | perfluoroheptene-1. |
| II | $C_7F_{15}COF$ | $K_2SO_4$ | 10 | 380 | perfluoroheptene-2. |
| III | $C_7F_{15}COF$ | $CaSO_4$ | 7 | 380 | perfluoroheptene-1, perfluoroheptene-2. |
| IV | $C_7F_{15}COF$ | $BaO$ | 10 | 250 | perfluoroheptene-1. |
| V | $C_7F_{15}COF$ | $NaHPO_4$ | 10 | 380 | perfluoroheptene-2. |
| VI | $C_7F_{15}COF$ | $BaSO_4$ | 10 | 258 | Do. |
| VII | $C_7F_{15}COF$ | $SiO_2$ (in form of pyrex glass wool). | 10 | 380 | perfluoroheptene-1 |
| VIII | $HC_6F_{16}COF$ | $BaSO_4$ | 10 | 250 | Do. |
| IX | $C_3F_7COCl$ | $K_2SO_4$ | 10 | 380 | perfluoropropylene. |
| X | $C_4F_8(COF)_2$ | $K_2SO_4$ | 10 | 380 | perfluoro-1, 3-butadiene. |
| XI | $C_7F_{15}COF$ | $NaF$ | 10 | 380 | |
| XII | $C_7F_{15}COF$ | | 10 | 380 | |

The above examples demonstrate, but do not limit, the preparation of fluoroolefins by the process of the present invention. The process of the present invention provides a method for the direct conversion of the acid halides to fluoroolefins without the intermediate steps of preparing an acid and forming the alkali metal salts from the acid. The terminally unsaturated fluoroolefins obtained by the process of the present invention are useful as comonomers in copolymerizations with tetrafluoroethylene and other ethylenically unsaturated fluorinated monomers. In view of their outstanding temperature stability and chemical inertness, the internally unsaturated fluoroolefins are useful in themselves as solvents, hydraulic fluids, and dielectric media.

I claim:

1. Process for the preparation of fluoroolefins which comprises contacting a vaporized fluorocarbon acid halide having general formulas of the class consisting of $XC_nF_{2n}COY$ and $C_{n+2}F_{2(n+2)}(COY)_2$, wherein X is of the class consisting of hydrogen and fluorine, Y is a halogen, and n an integer of greater than 1, with a catalyst of the class consisting of stable metal oxides, wherein the metal is selected from the class consisting of metals in group II–A of the periodic table and silicon, and stable oxygen-containing metal salts, wherein the metal is selected from the group consisting of metals in groups I–A II–A of the periodic table, at a temperature of 200° to 500° C., and recovering a fluoroolefin having the general formulas $XC_nF_{2n-1}$ and $C_{n+2}F_{2(n+2)-2}$, where X and n are as stated above.

2. A process for preparing fluoroolefins which comprises contacting a vaporized fluorocarbon acid halide having the general formula $XC_nF_{2n}COY$, wherein X is selected from the class consisting of hydrogen and fluorine, Y is a halogen and n an integer of greater than 1, with a stable metal oxide wherein the metal is selected from the class consisting of metals in group II–A of the periodic table and silicon, as a catalyst, at a temperature of 200° to 400° C. and recovering a fluoroolefin having the general formula $XC_nF_{2n-1}$ wherein X and n are as stated above.

3. Process as set forth in claim 2 wherein the fluorocarbon acid halide is a fluorocarbon acid fluoride.

4. Process as set forth in claim 3 wherein the metal oxide is barium oxide.

5. Process as set forth in claim 3 wherein the oxide catalyst is silicon dioxide.

6. Process for preparing fluoroolefins which comprises contacting a vaporized fluorocarbon acid halide having the general formula $XC_nF_{2n}COY$, wherein X is a member of the class consisting of hydrogen and fluorine, Y is a halogen, and n is an integer of greater than 1, with a stable oxygen containing metal salt, wherein the metal is selected from the class consisting of metals in groups I–A and II–A of the periodic table, as a catalyst, at a temperature of 200° to 400° C., and recovering a fluoroolefin, having the general formula $XC_nF_{2n-1}$ wherein X and n are as stated above.

7. The process as set forth in claim 6 wherein the fluorocarbon acid halide is a fluorocarbon acid fluoride.

8. The process as set forth in claim 7 wherein the catalyst is a sulfate of a metal of groups I–A and II–A of the periodic table.

9. The process as set forth in claim 8 wherein the metal sulfate is sodium sulfate.

10. The process as set forth in claim 8 wherein the metal sulfate is barium sulfate.

11. The process as set forth in claim 7 wherein the fluorocarbon acid halide is perfluorooctanoyl fluoride.

12. The process as set forth in claim 7 wherein the fluorocarbon acid halide is perfluorobutanoyl fluoride.

References Cited in the file of this patent

UNITED STATES PATENTS 2,741,634     Miller et al.     Apr. 10, 1956
2,894,996     Farlow et al.     July 14, 1959